(12) United States Patent
Singuru et al.

(10) Patent No.: US 11,203,268 B2
(45) Date of Patent: Dec. 21, 2021

(54) METHOD AND APPARATUS FOR SELECTING A CHARGING STATION

(71) Applicant: GM GLOBAL TECHNOLOGY OPERATIONS LLC, Detroit, MI (US)

(72) Inventors: Kausalya Singuru, Troy, MI (US); Donald K. Grimm, Utica, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 16/742,212

(22) Filed: Jan. 14, 2020

(65) Prior Publication Data

US 2021/0213844 A1    Jul. 15, 2021

(51) Int. Cl.
| | |
|---|---|
| *H02J 7/00* | (2006.01) |
| *H02J 7/14* | (2006.01) |
| *B60L 53/62* | (2019.01) |
| *B60L 53/64* | (2019.01) |
| *B60L 53/68* | (2019.01) |
| *B60L 58/12* | (2019.01) |

(52) U.S. Cl.
CPC .............. *B60L 53/62* (2019.02); *B60L 53/64* (2019.02); *B60L 53/68* (2019.02); *B60L 58/12* (2019.02); *H02J 7/00034* (2020.01); *H02J 7/0048* (2020.01); *B60L 2240/72* (2013.01); *B60L 2250/12* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 9,423,465 B1* | 8/2016 | Watts | ........................ | B60L 5/42 |
| 9,955,428 B1* | 4/2018 | Bacarella | ................ | H02J 7/005 |
| 2007/0067065 A1* | 3/2007 | El-Gasseir | .............. | H02J 3/008 |
| | | | | 700/286 |
| 2011/0016063 A1* | 1/2011 | Pollack | ................... | B60L 53/18 |
| | | | | 705/412 |
| 2012/0112754 A1* | 5/2012 | Kawai | ..................... | B60L 58/13 |
| | | | | 324/428 |
| 2012/0316717 A1* | 12/2012 | Daum | ................... | B60L 53/665 |
| | | | | 701/22 |
| 2013/0179061 A1* | 7/2013 | Gadh | ..................... | B60L 55/00 |
| | | | | 701/123 |

(Continued)

*Primary Examiner* — Alexis B Pacheco
(74) *Attorney, Agent, or Firm* — Quinn IP Law

(57) ABSTRACT

A method and associated system for selecting a charging station for a subject vehicle is described, and includes determining a state of charge of an on-vehicle DC power source arranged to supply electric power to a propulsion system for the subject vehicle. A travel route to a destination point is determined, and locations of a plurality of charging stations proximal to the travel route are identified. Desired states and corresponding weighting factors for a plurality of user-selectable parameters are determined, and a sorting routine is executed to rank the plurality of charging stations proximal to the travel route based upon the desired states and corresponding weighting factors for the plurality of user-selectable parameters and the state of charge of the on-vehicle DC power source. One of the charging stations is selected based upon the ranking, and a charging reservation is scheduled.

20 Claims, 2 Drawing Sheets

(56) References Cited

U.S. PATENT DOCUMENTS

| | | | | |
|---|---|---|---|---|
| 2014/0232320 A1* | 8/2014 | Ento July | ............ | H02J 7/0021 320/101 |
| 2015/0274028 A1* | 10/2015 | Payne | ................ | G01C 21/3461 701/22 |
| 2017/0326999 A1* | 11/2017 | Tani | ....................... | H02J 7/0013 |
| 2018/0329374 A1* | 11/2018 | Kelly | ..................... | G06Q 50/06 |

* cited by examiner

METHOD AND APPARATUS FOR SELECTING A CHARGING STATION

INTRODUCTION

Electric vehicles require charging, which may be accomplished at commercial or private charging stations. Factors associated with selecting a desired charging station include determining whether a charging station is available in the near future, or determining whether a charging station is proximal to a desired or convenient location. There may be benefits to facilitating selection and scheduling of a desired charging station based on a charge profile and travel time, in order to reduce waiting time and/or travel distance.

SUMMARY

The concepts described herein provide a method and associated system for selecting a charging station for a subject vehicle. The method includes determining, for the subject vehicle, a state of charge of an on-vehicle DC power source arranged to supply electric power to a propulsion system for the subject vehicle. A travel route to a destination point for the subject vehicle is determined, and locations of a plurality of charging stations proximal to the travel route for the subject vehicle are identified. Desired states and corresponding weighting factors for a plurality of user-selectable parameters are determined, and a sorting routine is executed to rank the plurality of charging stations proximal to the travel route for the subject vehicle based upon the desired states and corresponding weighting factors for the plurality of user-selectable parameters and the state of charge of the on-vehicle DC power source. One of the plurality of charging stations is selected based upon the ranking, and a charging reservation for the subject vehicle is scheduled with the selected one of the plurality of charging stations.

An aspect of the disclosure includes charging the on-vehicle DC power source of the subject vehicle at the selected one of the plurality of charging stations based upon the charging reservation.

Another aspect of the disclosure includes the plurality of user-selectable parameters including a charging cost, and wherein determining desired states and corresponding weighting factors for the plurality of user-selectable parameters comprises determining a minimum charging cost, and wherein the weighting factor is inversely related to the charging cost.

Another aspect of the disclosure includes the plurality of user-selectable parameters including an expected waiting time, and wherein determining desired states and corresponding weighting factors for the plurality of user-selectable parameters includes determining a minimum expected waiting time, and wherein the weighting factor is inversely related to the expected waiting time.

Another aspect of the disclosure includes the plurality of user-selectable parameters including a deviation from a travel route, and wherein determining desired states and corresponding weighting factors for the plurality of user-selectable parameters includes determining a minimum deviation from the travel route, and wherein the weighting factor is inversely related to the deviation from the travel route.

Another aspect of the disclosure includes the plurality of user-selectable parameters including a point of interest, and wherein determining desired states and corresponding weighting factors for the plurality of user-selectable parameters includes determining a user preference associated with the point of interest, and wherein the weighting factor is directly related to the user preference associated with the point of interest.

Another aspect of the disclosure includes the plurality of user-selectable parameters including a point of interest, and wherein determining desired states and corresponding weighting factors for the plurality of user-selectable parameters includes a quantity of charge points associated with one of the charging stations, and wherein the weighting factor is directly related to the quantity of charge points associated with one of the charging stations.

Another aspect of the disclosure includes the plurality of user-selectable parameters including a highway/urban travel route, and wherein determining desired states and corresponding weighting factors for the plurality of user-selectable parameters includes a user preference associated with the highway/urban travel route, and wherein the weighting factor is directly related to the user preference associated with the highway/urban travel route.

Another aspect of the disclosure includes the plurality of user-selectable parameters including customer reviews, and wherein determining desired states and corresponding weighting factors for the plurality of user-selectable parameters includes determining a user preference associated with the customer reviews, and wherein the weighting factor is directly related to the customer reviews.

Another aspect of the disclosure includes determining a ranking for the plurality of charging stations based upon the desired states and corresponding weighting factors for the plurality of user-selectable parameters and the state of charge of the on-vehicle DC power source comprises determining a ranking factor for each of the plurality of charging states in according with:

$$F_i = (S * Wc * Wt * Wd * W\text{poi} * Wn * Wb * We * Wr)$$

wherein:

$F_i$ represents a ranking factor for charging station i, wherein i represents one of the charging stations; and Wc represents a weighting factor associated with cost associated with the charging station i, Wt represents a weighting factor associated with an expected wait time associated with the charging station i, Wd represents a weighting factor associated with a deviation from the travel route associated with the charging station i, Wpoi represents a weighting factor associated with a point of interest associated with the charging station i, Wn represents a weighting factor associated with a quantity of charge points in the facility associated with the charging station i, Wb represents a weighting factor associated with a provider preference associated with the charging station i, We represents a weighting factor associated with a travel route associated with the charging station i, and Wr represents a weighting factor associated with customer reviews associated with the charging station i.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity, directional terms such as top, bottom, left, right, up, over, above, below, beneath, rear, and front, may be used with reference to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" refers to mechanical and electrical hardware, software, firmware, electronic control components, processing logic, and/or processor devices, individually or in combination, that provide the described functionality. This may include, without limitation, an application specific integrated circuit (ASIC), an electronic circuit, a processor (shared, dedicated, or group) that executes one or more software or firmware programs, a memory device that contains software or firmware instructions, a combinational logic circuit, and/or other components.

Figure 1:
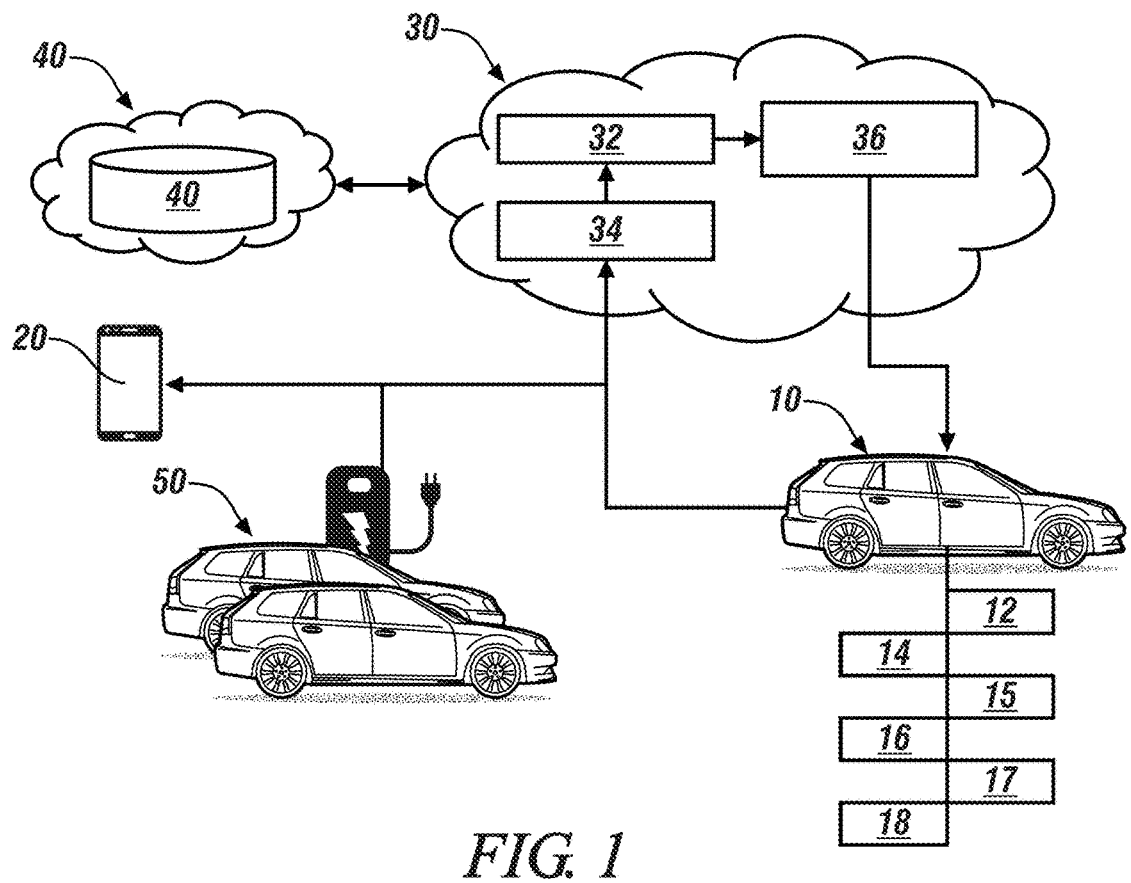
FIG. 1 schematically illustrates elements associated with selecting a desired charging station for a subject vehicle, in accordance with the disclosure.

Referring to the drawings, wherein like reference numerals correspond to like or similar components throughout the several Figures, FIG. 1, consistent with embodiments disclosed herein, schematically illustrates a subject vehicle 10, a charging station 50, an off-board server 30, and a cloud-based charging point database 40, wherein interactions therebetween are managed by a charging station selection routine 200. Details related to an embodiment of the charging station selection routine 200 are described with reference to FIG. 2. These elements may be associated with selecting a desired charging station 50 for the subject vehicle 10, scheduling a charging reservation for the subject vehicle 10 at the desired charging station 50, and executing a charging event for the subject vehicle 10 at the desired charging station 50. The method and apparatus for selecting, scheduling, and executing the charging event for the subject vehicle 10 at the desired charging station 50 advantageously employs the off-board server 30, the cloud-based charging point database 40, and the charging station selection routine 200.

After a period of energy depletion, the DC power source 14 may require re-charging before continued propulsion may resume. Such re-charging may occur by coupling the vehicle battery to a source of electrical power either directly, or through one or more intermediate components, collectively referred to as the charging station 50. The charging station 50 may be a stationary apparatus that may be disposed in a parking lot or other vehicle storage area that may include one or a plurality of parking spaces, including, e.g., a parking garage, a valet parking area, and a fleet vehicle storage area, etc. The desired charging station 50 may be a commercial or private charging station that is capable of transferring electric power from a stationary source to the subject vehicle 10.

The subject vehicle 10 is an electric vehicle, which may encompass any vehicle that includes a propulsion system 12 that employs electric power that is supplied by a DC power source 14 to generate tractive power for vehicle propulsion. Some examples of electric vehicles include, but are not limited to, electric-only electric vehicles (EVs), plug-in hybrid electric vehicles (PHEVs), extended range electric vehicles (EREVs). These vehicles may include passenger cars, cross-over vehicles, sport-utility vehicles, recreational vehicles, trucks, buses, commercial vehicles, etc. The subject vehicle 10 may further include, but not be limited to a mobile platform in the form of an industrial vehicle, agricultural vehicle, aircraft, watercraft, train, all-terrain vehicle, personal movement apparatus, robot and the like to accomplish the purposes of this disclosure.

The subject vehicle 10 includes a controller 15, an on-vehicle navigation system 16 including a global positioning system (GPS) sensor, a telematics system 17, and a human-machine interface system (HMI) 18. The navigation system 16 including the GPS sensor is capable of communicating with the cloud-based charging point database 40 and the off-board server 30 via the telematics system 17.

The HMI 18 provides for human/machine interaction, for purposes of directing controlling the navigation system 16 and other operations. This includes selecting, scheduling, and executing a charging event for the subject vehicle 10 at a desired charging station 50.

The telematics system 17 includes a wireless telematics communication system capable of extra-vehicle communications, including communicating with a communication network having wireless and wired communication capabilities. The telematics system 17 is capable of extra-vehicle communications that includes short-range vehicle-to-vehicle (V2V) communication and/or vehicle-to-everything (V2x) communication, which may include communication with an infrastructure monitor, e.g., a traffic camera. Alternatively or in addition, the telematics system 17 has a wireless telematics communication system capable of short-range wireless communication to a handheld device 20, e.g., a cell phone, a satellite phone, or another telephonic device. In one embodiment the handheld device 20 is loaded with a software application that includes a wireless protocol to communicate with the telematics system 17, and the handheld device 20 executes the extra-vehicle communication, including communicating with the off-board server 30.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instruction sets in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
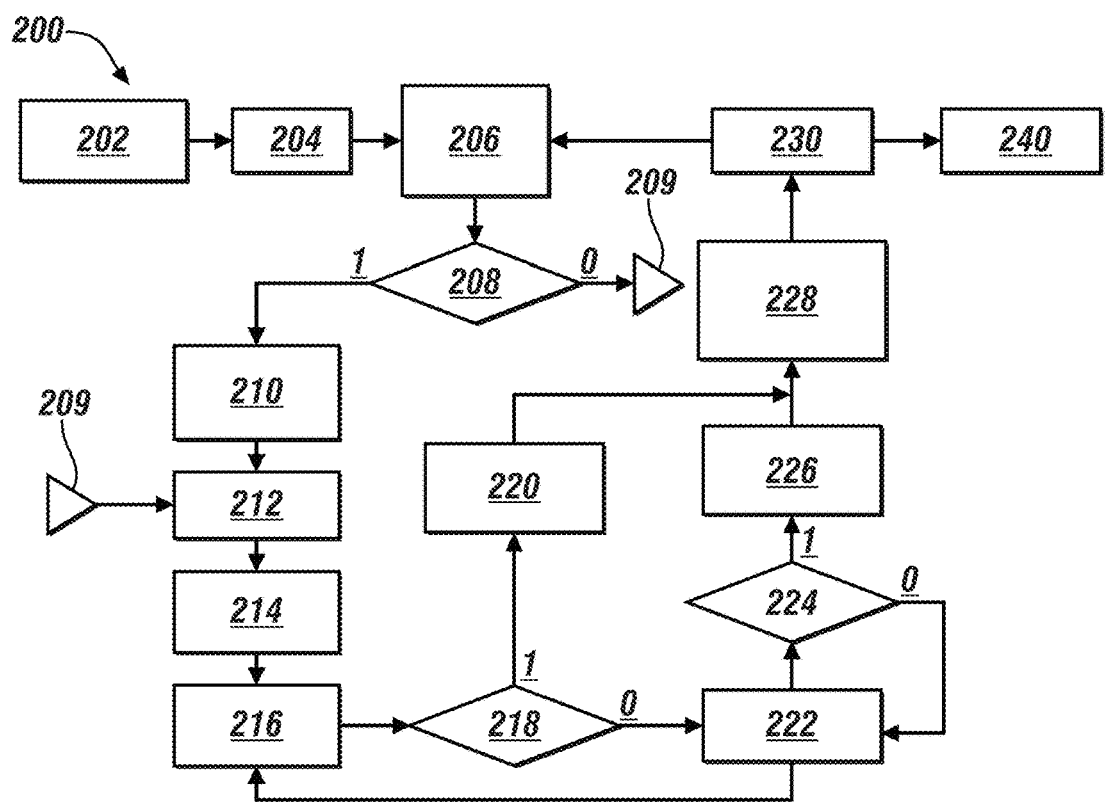
FIGS. 2 and 3 schematically illustrate a process for selecting and reserving a desired charging station and executing a charging event for a subject vehicle, in accordance with the disclosure.
Figure 3:
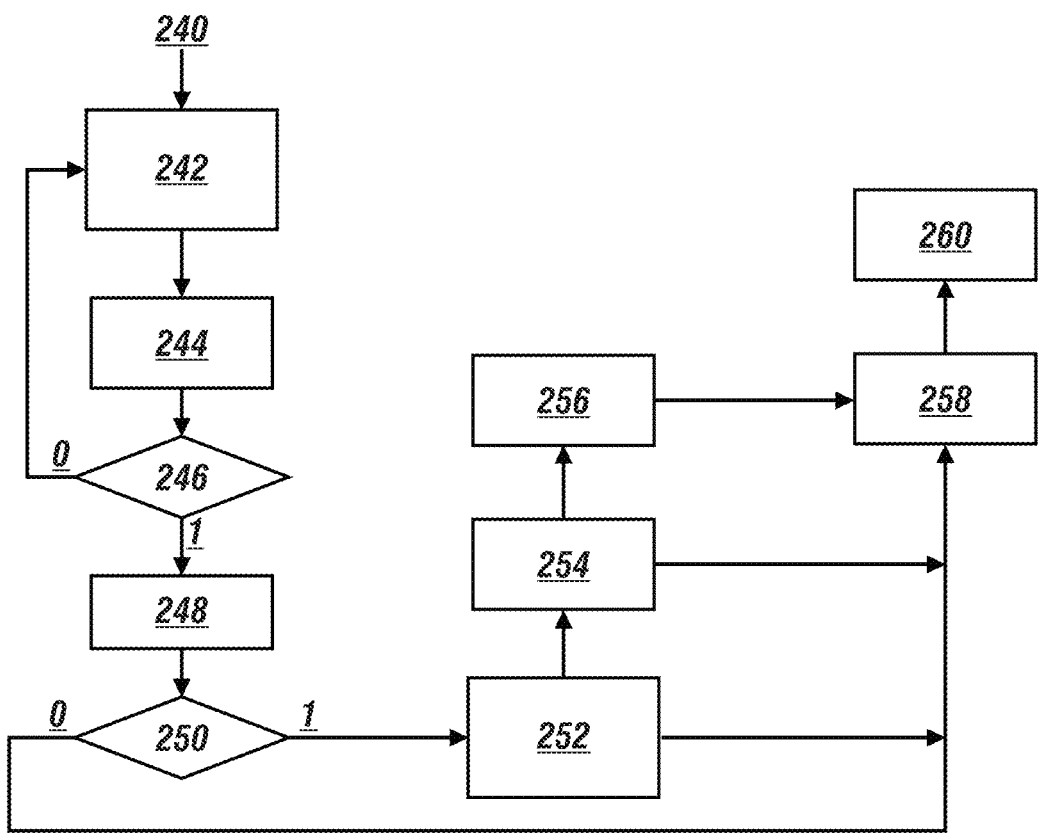

FIGS. 2 and 3 schematically show one embodiment of the charging station selection routine 200 for selecting, scheduling and executing a charging event at a desired charging station for the subject vehicle 10 described with reference to FIG. 1. The charging station selection routine 200 provides a data-driven decision algorithm for evaluating potential charging stations based on user preferences including distance and time to wait, while considering user preferences of wait time, travel distance, charging station type, cost factor and characteristics of potential charge point location/area. This enables users to select a desired charge point, and a location of a charging station based on the charge profile and travel time. This reduces the time to wait or distance travelled to the desired charging point. Table 1 is provided as a key wherein the numerically labeled blocks and the corresponding functions are set forth as follows, corresponding to the charging station selection routine 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 202 | Route planning, charging reservation request |
| 204 | Communicate to server |
| 206 | Query database |
| 208 | Route plan available? |
| 209 | Advance to step 212 |
| 210 | Calculate distance(s) to potential charging station(s) |
| 212 | Determine parameters to potential charging station(s) based upon proximity to the desired travel route |
| 214 | Determine weight factors |
| 216 | Evaluate and rank the potential charging stations |
| 218 | Identify potential charging station(s) that meet search criteria |
| 220 | Display potential charging station(s) that meet search criteria |
| 222 | Remove lowest ranked constraint |
| 224 | Are constraints exhausted? |
| 226 | Display closest potential charging stations |
| 228 | Request reservation at charging station |
| 230 | Display, suggest navigation |
| 240 | Charging reservation |
| 242 | Request reservation |
| 244 | Notify charging station |
| 246 | Confirm reservation |
| 248 | Wait |
| 250 | Charging initiated? |
| 252 | Send Cancellation request to other providers |
| 254 | Monitor SOC, charge interruptions |
| 256 | Inform operator of charge interruption |
| 260 | Cancel reservation |

Execution of the charging station selection routine 200 may proceed as follows. The steps of the charging station selection routine 200 may be executed in a suitable order, and are not limited to the order described with reference to FIG. 2. As employed herein, the term "1" indicates an answer in the affirmative, or "YES", and the term "0" indicates an answer in the negative, or "NO".

The charging station selection routine 200 initiates when a vehicle operator executes a route planning event by selecting a desired destination and/or requesting a charging reservation, via the HMI 18 or the handheld device 20 (202). This includes determining, for the subject vehicle 10, a state of charge (SOC) for the DC power source 14 that supplies electric power to the propulsion system 12, and a charge profile for the DC power source 14. The charge profile includes an expected charging time for charging the DC power source 14 based upon a rating that includes a DC power source charging acceptance rate and the charging station's power output rate, available power (peak/off-peak), temperature, charge point type and connections, the type of vehicle and a state of battery health.

The SOC and the charge profile are employed to determine an estimated remaining driving range for the subject vehicle 10.

The SOC and the charge profile are also communicated to the off-board server 30 (204), which queries the cloud-based charging point database 40 (206) to identify locations of a plurality of potential charging stations that are proximal to a desired travel route to the desired destination for the subject vehicle 10 and within the estimated remaining driving range of the subject vehicle 10, and associated information. The associated information for each of the potential charging stations includes electrical connector plug options and compatibility with the subject vehicle 10, type of charging system, power costs, deviation from the desired travel route, charging station availability and waiting time, and other factors.

When no route plan is available (208)(0), the routine advances (209) to Step 212 as part of requesting a charging reservation.

When the request includes a charging reservation request with a route plan (208)(1), the routine executes a series of steps to determine, quantify, and weight user preferences in order to rank the potential charging stations that are proximal to the desired travel route to the desired destination for the subject vehicle 10 and within the estimated remaining driving range of the subject vehicle 10.

For each of the potential charging stations that are proximal to the desired travel route, parameters are determined based upon proximity to the subject vehicle 10 at its present location (210). Parameters are determined based upon proximity to the desired travel route, i.e., deviation from the desired travel route, and an associated travel time (212). These parameters include, by way of example, a closest point en route to each charge point cp, expressed as follows:

$$cp=\{(x1,y1),(x2,y2),(x3,y3),\ldots,(xn,yn)\}$$

These parameters include a distance from the closest point en route d, expressed as follows:

$$d=\{d1,d2,d3,\ldots,dn\}$$

These parameters include a closest point from the subject vehicle c, expressed as follows:

$$c=\{c1,c2,c3\ldots,cn\}$$

These parameters include an expected travel time considering weather and traffic related delays t, expressed as follows:

$$t=\{t1,t2,t3\ldots tn\}$$

Figure 4:
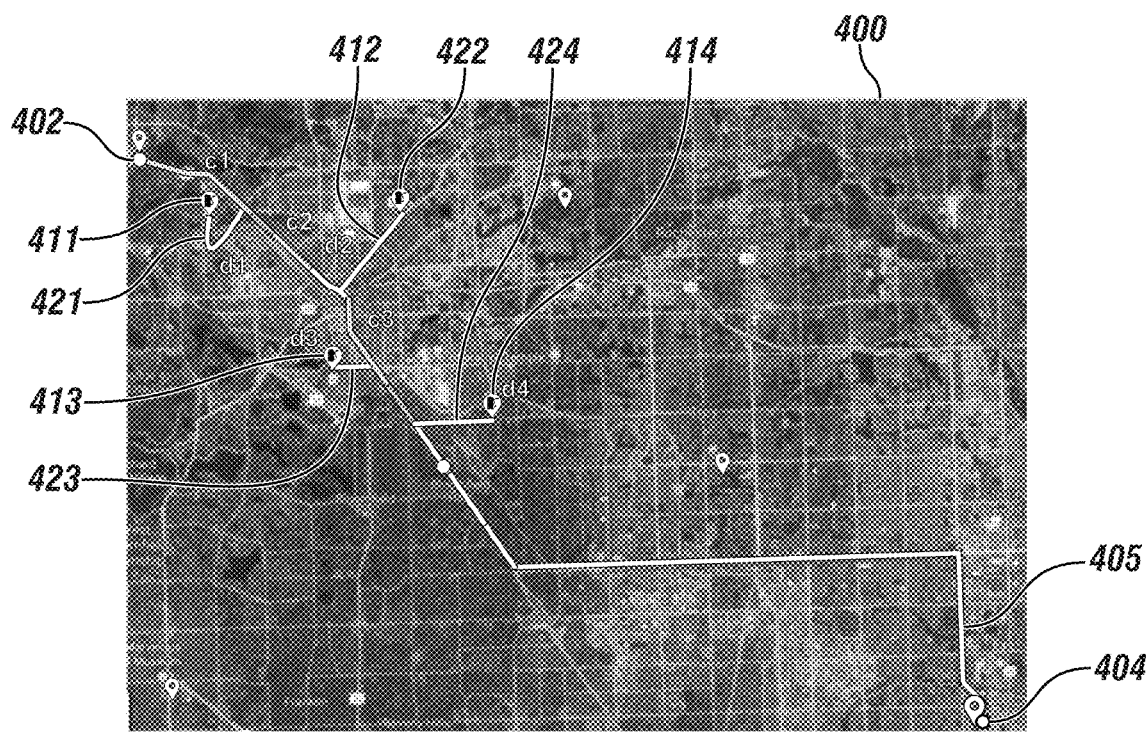
FIG. 4 pictorially illustrates a road map on which a desired travel route between a point of origin and a destination is depicted and a plurality of potential charging stations are shown, in accordance with the disclosure.

FIG. 4 pictorially depicts a road map 400 on which a desired travel route 405 between a point of origin 402 and a destination 404 is depicted. A plurality of potential charging stations is shown, including designated as C1 411, C2 412, C3 413, and C4 414. Corresponding deviations (distances) from the travel route 405 associated with the potential charging stations are also shown, and are designated as d1 421, corresponding to C1 411; d2 422, corresponding to C2 412; d3 423, corresponding to C3 413; and d4 424, corresponding to C4 424.

Referring again to FIGS. 2 and 3, weight factors associated with each of the user preferences are determined, and the user preferences are factored into the evaluation employing the weight factors that are associated with each user preference (214). Examples of user preferences and weight factors include weights for each of 1 ... n potential charging stations, e.g., C1 411, C2 412, C3 413, and C4 414.

The weight factors include Cost: Wc={Wc1, Wc2 ... Wcn}, wherein the weight is inversely related to the cost; Expected wait time: Wt={Wt1, Wt2 ... Wtn}, wherein the weight is inversely related to the expected wait time; Deviation from travel route: Wd={Wd1, Wd2 ... Wdn}, wherein the weight is inversely related to the distance or time from the travel route; Point of interest (POI) match: Wpoi={Wpoi1, Wpoi2 ... Wpoin}, wherein the weight is directly related to the POI match; Number (quantity) of charge points in the facility: Wn={Wn1, Wn2 ... Wnn}, wherein the weight is directly related to the quantity of charge points; Provider preference: Wb={Wb1, Wb2 ... Wbn}, wherein the weight is specific to the provider preference; En route (Interstate vs city): We={We1, We2 ... Wen}, wherein the weight is specific to the user preference for interstate or city operation; and Customer reviews: Wr={Wr1, Wr2 ... Wrn}, wherein the weight is directly related to positive customer reviews, indirectly directly related to negative customer reviews, or a combination thereof.

Constraints may be applied to each of the potential charging stations as follows to evaluate and rank the potential charging stations (216), e.g., C1 411, C2 412, C3 413, and C4 414 that are shown with reference to FIG. 4, wherein the potential charging stations are evaluated and ranked based upon the weight factors and the constraints.

Solution: S=Sort(d+c or t); or optimize for one of d, c, or t based upon user preferences;

Apply Constraints:
S<travel range left,
d<max deviation from route,
cost c={min:max},
POI match=max,
Quantity of charge points>=user preferred,
Provider=user input,
En route=user input, and
t=estimated travel time.

For each of the potential charging states i, (i=1 through n), a ranking factor $F_i$ is determined, as follows:

$$F_i=(S*Wc*Wt*Wd*W\text{poi}*Wn*Wb*We*Wr) \quad [1]$$

wherein:

$F_i$ represents a ranking factor for charging station i, wherein i represents one of the charging stations; and Wc represents a weighting factor associated with cost associated with the charging station i, Wt represents a weighting factor associated with an expected wait time associated with the charging station i, Wd represents a weighting factor associated with a deviation from the travel route associated with the charging station i, Wpoi represents a weighting factor associated with a point of interest associated with the charging station i, Wn represents a weighting factor associated with a quantity of charge points in the facility associated with the charging station i, Wb represents a weighting factor associated with a provider preference associated with the charging station i, We represents a weighting factor associated with a travel route associated with the charging station i, and Wr represents a weighting factor associated with customer reviews associated with the charging station i.

The ranking factors $F_i$ for the potential charging states i, (i=1 through n), are determined, and subjected to sorting based upon their respective magnitudes, and conveyed to step 218 for evaluation.

When one or more of the potential charging stations that meet the constraints that are based upon the user preferences are identified (218)(1), the potential charging stations that meet the constraints are displayed via the HMI 18, along with their associated rankings associated with sorting by the ranking factor $F_t$ to enable the vehicle operator to select one of the potential charging stations as a preferred charging station (220). The controller 15 communicates with the preferred charging station to request a charging reservation for the subject vehicle 10 (228), and the navigation system 16 determines a travel path to the preferred charging station.

The HMI 18 provides a visual display in context of the navigation map to show one or more desired charging stations with associated ranks, and conditions related to traffic and weather, including road conditions related to congestion en route (230).

When all of the potential charging stations are eliminated or do not meet the constraints that are based upon the user preferences (218)(0), the user preferences are evaluated to identify and eliminate the one of the user preferences or constraints having the lowest ranking from the evaluation (222), (224)(0), and the evaluation and ranking of the potential charging states are re-executed (216) and re-evaluated to identify potential charging station(s) that meet the search criteria (218). This is an iterative process wherein the constraints are sequentially eliminated based upon their rankings.

When all of the constraints have been eliminated (224)(1), the routine conveys via the HMI 18 that no desired locations have been identified. The routine also visually displays locations of potential charging stations that are closest to the subject vehicle 10 without consideration of any of the constraints (226) for selection of a desired charging station by the vehicle operator.

The controller 15 communicates with the desired charging station to request a charging reservation for the subject vehicle 10 (228), and the navigation system 16 determines a travel path to the desired charging station, which is displayed on the HMI 18. This includes directing operation of the subject vehicle 10 to the desired charging station.

Referring now to FIG. 3, the reservation request process (240) includes the operator requesting a reservation (242) with a communication to the desired charging station (244) and a confirmation of the requested time from the desired charging station (246). This may include, in one embodiment, the reservation request process (240) including the operator requesting multiple reservations at multiple requested times and locations, with communications to the desired charging stations and confirmations of the requested times from the desired charging stations, such as may occur on a trip that requires multiple charging events. When there is no confirmation from the desired charging station (246)(0), the operator is prompted to seek a reservation at another time or at another desired charging state, and the reservation process begins anew. When there is a confirmation from the desired charging station (246)(1), the operator travels to the desired charging state and waits for availability of the charging station (248). When no charging is initiated after a period of time (250)(0), the operator is informed via their mobile device (258), with the option of pursuing charging elsewhere and cancelling the reservation, or waiting in a queue for one of the desired charging stations to become available (260).

When charging is initiated (250)(1), a cancellation request is sent to other charging providers if the operator has double-booked reservations (252).

During charging, the SOC of the battery is monitored, along with occurrence of charge interruptions (254), and the operator is kept informed via their mobile device (258). This may include, when available on-site, communicating a source of a charge interruption, such as tampering by other users.

When a charge interruption occurs (256), the operator is kept informed via their mobile device (258), including being kept informed of a delay time. The operator is given the option of pursuing charging elsewhere and cancelling the reservation, or waiting in a queue for one of the desired charging stations to become available (260).

In this manner, user preferences, e.g., a time to wait, en route, shortest distance, charge point type, cost, wait time at the charge point location may be employed as inputs to a search ranking algorithm. Weights may be defined and normalized based on user preferences. Use the weight factors in ranking the charge point locations. This also facilitates a reservation booking at a preferred charge point or at multiple charge points, and may be set up to enable multiple preferences for weekend/weekday/long distance travel.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for selecting a charging station for a subject vehicle, the method comprising:
   determining, for the subject vehicle, a state of charge of an on-vehicle DC power source arranged to supply electric power to a propulsion system for the subject vehicle;
   determining a travel route to a destination point for the subject vehicle;
   determining desired states and corresponding weighting factors for a plurality of user-selectable parameters;
   identifying locations of a plurality of charging stations that are proximal to the travel route for the subject vehicle;
   determining a ranking factor for the plurality of charging stations based upon the desired states and corresponding weighting factors for the plurality of user-selectable parameters and the state of charge of the on-vehicle DC power source;
   selecting one of the plurality of charging stations based upon the ranking factor; and
   scheduling a charging reservation for the subject vehicle with the selected one of the plurality of charging stations.

2. The method of claim 1, further comprising charging the on-vehicle DC power source of the subject vehicle at the selected one of the plurality of charging stations based upon the charging reservation.

3. The method of claim 1, wherein the plurality of user-selectable parameters includes a charging cost, and wherein determining the desired states and corresponding weighting factors for the plurality of user-selectable parameters comprises determining a minimum charging cost, and wherein the corresponding weighting factor for the charging cost is inversely related to the charging cost.

4. The method of claim 1, wherein the plurality of user-selectable parameters includes an expected waiting time, and wherein determining the desired states and corresponding weighting factors for the plurality of user-selectable parameters comprises determining a minimum expected waiting time, and wherein the corresponding weighting factor for the waiting time is inversely related to the expected waiting time.

5. The method of claim 1, wherein the plurality of user-selectable parameters includes a deviation from a travel route, and wherein determining the desired states and corresponding weighting factors for the plurality of user-selectable parameters comprises determining a minimum deviation from the travel route, and wherein the corresponding weighting factor for the deviation from the travel route is inversely related to the deviation from the travel route.

6. The method of claim 1, wherein the plurality of user-selectable parameters includes a point of interest, and wherein determining the desired states and corresponding weighting factors for the plurality of user-selectable parameters comprises a user preference associated with the point of interest, and wherein the corresponding weighting factor for the user preference associated with the point of interest is directly related to the user preference associated with the point of interest.

7. The method of claim 1, wherein the plurality of user-selectable parameters includes a point of interest, and wherein determining the desired states and corresponding weighting factors for the plurality of user-selectable parameters comprises a quantity of charge points associated with one of the charging stations, and wherein the corresponding weighting factor for the user preferably associated with the quantity of charge points associated with one of the charging stations is directly related to the quantity of charge points associated with one of the charging stations.

8. The method of claim 1, wherein the plurality of user-selectable parameters includes a highway/urban travel route, and wherein determining the desired states and corresponding weighting factors for the plurality of user-selectable parameters comprises a user preference associated with the highway/urban travel route, and wherein the corresponding weighting factor for the user preference associated with the highway/urban travel route is directly related to the user preference associated with the highway/urban travel route.

9. The method of claim 1, wherein the plurality of user-selectable parameters includes customer reviews, and wherein determining the desired states and corresponding weighting factors for the plurality of user-selectable parameters comprises determining a user preference associated with the customer reviews, and wherein the corresponding weighting factor for the user preference associated with the customer reviews is directly related to the user preferably associated with the customer reviews.

10. The method of claim 1, wherein determining a ranking for the plurality of charging stations based upon the desired states and corresponding weighting factors for the plurality of user-selectable parameters and the state of charge of the on-vehicle DC power source comprises determining a plurality of ranking factors for the plurality of charging stations, and executing a sorting routine of the plurality of charging stations based upon the plurality of ranking factors.

11. The method of claim 10, wherein each of the plurality of ranking factors is determined in according with:

$$F_i = (S * Wc * Wt * Wd * W\text{poi} * Wn * Wb * We * Wr)$$

wherein:
$F_i$ represents a ranking factor for charging station i, wherein i represents one of the charging stations; and
Wc represents a weighting factor associated with cost associated with the charging station i,
Wt represents a weighting factor associated with an expected wait time associated with the charging station i,
Wd represents a weighting factor associated with a deviation from the travel route associated with the charging station i,
Wpoi represents a weighting factor associated with a point of interest associated with the charging station i,
Wn represents a weighting factor associated with a quantity of charge points associated with the charging station i,
Wb represents a weighting factor associated with a provider preference associated with the charging station i,
We represents a weighting factor associated with a travel route associated with the charging station i, and
Wr represents a weighting factor associated with customer reviews associated with the charging station i.

12. A subject vehicle, comprising:
   a DC power source arranged to supply electric power to a propulsion system for the subject vehicle; and
   a controller, wherein the controller is in communication with the DC power source and in communication with an on-vehicle navigation system including a global positioning system (GPS) sensor, a telematics system, and a human-machine interface system (HMI), the controller including an instruction set associated with a charging station selection routine, the instruction set executable to:

determine, for the subject vehicle, a state of charge of the on-vehicle DC power source;

determine a travel route to a destination point for the subject vehicle;

determine desired states and corresponding weighting factors for a plurality of user-selectable parameters;

identify locations of a plurality of charging stations that are proximal to the travel route for the subject vehicle;

determine a ranking factor for each of the plurality of charging stations based upon the desired states and corresponding weighting factors for the plurality of user-selectable parameters and the state of charge of the on-vehicle DC power source;

select one of the plurality of charging stations based upon the ranking factor;

schedule a charging reservation for the subject vehicle with the selected one of the plurality of charging stations; and direct operation of the subject vehicle to the selected one of the plurality of charging stations via the HMI.

13. The subject vehicle of claim 12, further comprising the instruction set executable to direct charging of the on-vehicle DC power source of the subject vehicle at the selected one of the plurality of charging stations based upon the charging reservation.

14. The subject vehicle of claim 12, wherein the plurality of user-selectable parameters includes a charging cost, and wherein the instruction set executable to determine the desired states and corresponding weighting factors for the plurality of user-selectable parameters comprises the instruction set executable to determine a minimum charging cost, and wherein the corresponding weighting factor for the charging cost is inversely related to the charging cost.

15. The subject vehicle of claim 12, wherein the plurality of user-selectable parameters includes an expected waiting time, and wherein the instruction set executable to determine the desired states and corresponding weighting factors for the plurality of user-selectable parameters comprises the instruction set executable to determine a minimum expected waiting time, and wherein the corresponding weighting factor for the expected waiting time is inversely related to the expected waiting time.

16. The subject vehicle of claim 12, wherein the plurality of user-selectable parameters includes a deviation from a travel route, and wherein the instruction set executable to determine the desired states and corresponding weighting factors for the plurality of user-selectable parameters comprises the instruction set executable to determine a minimum deviation from the travel route, and wherein the corresponding weighting factor for the deviation from the travel route is inversely related to the deviation from the travel route.

17. The subject vehicle of claim 12, wherein the plurality of user-selectable parameters includes a point of interest, and wherein the instruction set executable to determine the desired states and corresponding weighting factors for the plurality of user-selectable parameters comprises a user preference associated with the point of interest, and wherein the corresponding weighting factor for the user preference associated with the point of interest is directly related to the user preference associated with the point of interest.

18. The subject vehicle of claim 12, wherein the plurality of user-selectable parameters includes a point of interest, and wherein the instruction set executable to determine the desired states and corresponding weighting factors for the plurality of user-selectable parameters comprises a quantity of charge points associated with one of the charging stations, and wherein the corresponding weighting factor for the quantity of charge points associated with one of the charging stations is directly related to the quantity of charge points associated with the charging stations.

19. The subject vehicle of claim 12, wherein the plurality of user-selectable parameters includes a highway/urban travel route, and wherein the instruction set executable to determine the desired states and corresponding weighting factors for the plurality of user-selectable parameters comprises a user preference associated with the highway/urban travel route, and wherein the corresponding weighting factor for the user preference associated with the highway/urban travel route is directly related to the user preference associated with the highway/urban travel route.

20. The subject vehicle of claim 12, wherein the instruction set is executable to determine the ranking factor for each of the plurality of charging stations in accordance with:

$$F_i = (S*Wc*Wt*Wd*W\text{poi}*Wn*Wb*We*Wr)$$

wherein:
$F_i$ represents a ranking factor for charging station i, wherein i represents one of the charging stations; and
Wc represents a weighting factor associated with cost associated with the charging station i,
Wt represents a weighting factor associated with an expected wait time associated with the charging station i,
Wd represents a weighting factor associated with a deviation from the travel route associated with the charging station i,
Wpoi represents a weighting factor associated with a point of interest associated with the charging station i,
Wn represents a weighting factor associated with a quantity of charge points associated with the charging station i,
Wb represents a weighting factor associated with a provider preference associated with the charging station i,
We represents a weighting factor associated with a travel route associated with the charging station i, and
Wr represents a weighting factor associated with customer reviews associated with the charging station i.

* * * * *